(12) United States Patent
Coscarella (10) Patent No.: US 11,214,953 B2
(45) Date of Patent: Jan. 4, 2022

(54) LOCKED BACKWATER VALVE

(71) Applicant: Gabe Coscarella, Edmonton (CA)

(72) Inventor: Gabe Coscarella, Edmonton (CA)

(*) Notice: Subject to any disclaimer, the term of this patent is extended or adjusted under 35 U.S.C. 154(b) by 0 days.

(21) Appl. No.: 16/795,347

(22) Filed: Feb. 19, 2020

(65) Prior Publication Data

US 2020/0263410 A1    Aug. 20, 2020

Related U.S. Application Data

(60) Provisional application No. 62/807,579, filed on Feb. 19, 2019.

(51) Int. Cl.
| | |
|---|---|
| *F16K 15/18* | (2006.01) |
| *E03F 7/04* | (2006.01) |
| *F16K 15/03* | (2006.01) |
| *F16K 31/22* | (2006.01) |

(52) U.S. Cl.
CPC ............. *E03F 7/04* (2013.01); *F16K 15/03* (2013.01); *F16K 15/1821* (2021.08); *F16K 31/22* (2013.01); *Y10T 137/053* (2015.04); *Y10T 137/6028* (2015.04); *Y10T 137/7731* (2015.04)

(58) Field of Classification Search
CPC .......... E03F 7/04; F16K 15/181; F16K 31/22; F16K 31/18; F16K 31/26; F16K 37/0033; F16K 37/0041; F16K 35/00; F16K 35/02; F16K 35/025; F16K 35/027; F16K 15/03–038; F16K 31/20; F16K 31/52441; F16K 31/5282; F16K 31/535; F16K 31/563; Y10T 137/7485; Y10T 137/7339; Y10T 137/7342; Y10T 137/0402; Y10T 137/0441; Y10T 137/0486; Y10T 137/0491; Y10T 137/053; Y10T 137/6035; Y10T 137/6011; Y10T 137/6028; Y10T 137/6086; Y10T 137/6184; Y10T 137/6188; Y10T 137/7898–7903;
(Continued)

(56) References Cited

U.S. PATENT DOCUMENTS

| | | | | |
|---|---|---|---|---|
| 642,998 | A | * | 2/1900 | O'Bleness et al. ...... F16K 17/00 137/463 |
| 665,181 | A | * | 1/1901 | Confer .................... F16K 17/00 137/463 |

(Continued)

FOREIGN PATENT DOCUMENTS

| | | |
|---|---|---|
| CA | 2344321 A1 | 4/2010 |
| CA | 2339462 A1 | 7/2010 |
| CA | 2414634 A1 | 9/2010 |

*Primary Examiner* — Craig J Price
(74) *Attorney, Agent, or Firm* — Christensen O'Connor Johnson Kindness PLLC (57) ABSTRACT

A backwater valve has a hollow valve body with an inlet and an outlet and a valve member pivotally movable about a pivot axis disposed above the inlet. The valve member is movable between a closed position covering the inlet and an open position. The valve member has a specific gravity that is greater than water and has a basin that causes the valve member to be buoyant when the basin is filled with air. A releasable latch holds the valve member in the open position and releases the valve member when the valve member pivots to a release position. A rotational stop engages the valve member at a fill position permitting water to overflow into the basin.

20 Claims, 11 Drawing Sheets

(58) Field of Classification Search
CPC ......... Y10T 137/7358; Y10T 137/7875; Y10T 137/7722–7734
USPC .......... 137/448, 527–527.8, 403, 404, 15.01, 137/15.08, 15.17, 15.18, 15.26, 315.08, 137/315.33, 315.11, 315.16, 329.1, 329.2, 137/455–467, 420, 421; 251/89–90, 93, 251/101–110, 288, 107, 111, 114
See application file for complete search history.

(56) References Cited

U.S. PATENT DOCUMENTS

| | | | | |
|---|---|---|---|---|
| 1,630,783 | A * | 5/1927 | Clark | A62C 35/645 169/22 |
| 1,699,706 | A * | 1/1929 | Loepsinger | A62C 35/645 169/22 |
| 1,707,573 | A * | 4/1929 | Rose | A62C 35/645 169/22 |
| 2,327,055 | A * | 8/1943 | McMahon | F16K 17/32 137/458 |
| 2,694,408 | A * | 11/1954 | McRae | G05D 7/0193 137/460 |
| 3,075,547 | A * | 1/1963 | Scaramucci | F16K 15/03 137/516.29 |
| 3,135,332 | A * | 6/1964 | Merdinyan | A62C 35/605 169/22 |
| 3,202,165 | A | 8/1965 | Yavicoli | |
| 4,067,095 | A * | 1/1978 | Cameron | B23P 15/001 137/315.04 |
| 4,091,624 | A * | 5/1978 | Steinke | E02B 8/045 405/100 |
| 4,777,979 | A | 10/1988 | Twerdochlib | |
| 5,113,901 | A | 5/1992 | Young | |
| 5,156,182 | A * | 10/1992 | Scaramucci | F16K 15/03 137/454.2 |
| 5,161,566 | A * | 11/1992 | Scaramucci | F16K 15/03 137/328 |
| 5,209,454 | A | 5/1993 | Engdahl et al. | |
| 5,826,609 | A * | 10/1998 | Watts | E03F 7/04 137/15.17 |
| 6,247,489 | B1 * | 6/2001 | Maskell | F16K 15/03 137/269.5 |
| 6,314,993 | B1 * | 11/2001 | Matthews | F16K 15/033 137/527 |
| 6,318,404 | B2 | 11/2001 | Coscarella | |
| 6,397,874 | B1 * | 6/2002 | Featheringill | E03F 1/006 137/112 |
| 6,446,665 | B2 * | 9/2002 | Coscarella | F16K 15/03 137/409 |
| 6,499,503 | B2 | 12/2002 | Coscarella | |
| 6,679,283 | B1 * | 1/2004 | Coscarella | F16K 3/0218 137/315.11 |
| 7,152,615 | B1 | 12/2006 | Engdahl | |
| 7,757,706 | B2 * | 7/2010 | Coscarella | F16K 15/03 137/315.41 |
| 8,096,318 | B2 | 1/2012 | Coscarella | |
| 8,578,961 | B2 | 11/2013 | Coscarella | |
| 9,097,363 | B2 | 8/2015 | Coscarella | |
| 9,863,134 | B2 | 1/2018 | Coscarella | |
| 9,903,106 | B2 | 2/2018 | Coscarella | |

* cited by examiner

LOCKED BACKWATER VALVE

TECHNICAL FIELD

This relates to a backwater valve used to prevent a backflow of water, and in particular, a valve that closes when the water level reaches a predetermined height.

BACKGROUND

Backwater valves are often installed in the drainage lines of a residence to prevent backflow of sewage into the residence in the event of a backup. U.S. Pat. No. 7,757,706 (Coscarella) is an example of a backwater valve that prevents backflow from a sewer line into a residence.

SUMMARY

According to an aspect, there is provided a backwater valve comprising a hollow valve body having an inlet and an outlet; a valve member pivotally movable about a pivot axis disposed above the inlet, the valve member being movable between a closed position in which the valve member directly engages and covers the inlet to prevent fluid flow through the inlet and an open position in which the valve member is away from the inlet wherein the valve member has a specific gravity that is greater than water, the valve member comprises a basin that causes the valve member to be buoyant in water when the valve member is in the open position and the basin is filled with air, the top of the basin comprising an opening, a releasable latch that retains the valve member in the open position, the releasable latch releasing the valve member when the valve member pivots to a release position above the open position to permit pivotal movement of the valve member toward the closed position, and a rotational stop that engages the valve member at a fill position to permit a sufficiently high water level to overflow into the basin, the fill position being at or above the release position.

According to other aspects, the releasable latch may comprise a hook that releases from an aperture carried by the valve member when the valve member pivots to the release position, the valve member may operate as a normally closed valve after the backwater flow has receded from the hollow valve body, and the valve member may comprise a sealing face having a convex surface and a concave surface opposite the sealing face, the concave surface may define the basin, the sealing surface may engage the inlet when the valve member is in the closed position, the releasable latch may be a spring-loaded, the releasable latch may retract and release the valve member when the valve member pivots to the release position, the valve member may comprise a removable valve cartridge, the valve cartridge may comprise an extension rod for removing the valve cartridge from the hollow valve body, the backwater valve may further comprise an electrical circuit connected to a sensor, the sensor using the electrical circuit to detect when the releasable latch has released the valve member, the releasable latch may complete the electrical circuit upon releasing the valve member, and the rotational stop may be located above the inlet.

According to an aspect, there is provided a method of preventing backwater flow comprising the steps of:

installing a backwater valve in a path of the backflow, the backwater valve comprising a hollow valve body having an inlet and an outlet and a valve member pivotally movable about a pivot axis disposed above the inlet wherein the valve member has a specific gravity that is greater than water and the valve member comprises a basin, the top of the basin comprising an opening;

using a releasable latch, latching the valve member in an open position in which the valve is away from the inlet;

upon a backwater flow rising to a first water level within the hollow valve body, permitting the valve member to float upon the backwater flow and pivot from the open position to a release position;

releasing the releasable latch when the valve member reaches the release position; and after the releasable latch is released, permitting water to flood the basin through the opening of the basin such that the valve member sinks and pivots to a closed position in which the valve member directly engages and covers the inlet to prevent the backwater flow from flowing through the inlet.

According to other aspects, water may flood the basin upon the backwater flow rising to a second water level beyond the first water level, the valve may engage a rotational stop when the backwater flow is at or below the second water level, the releasable latch may comprise a hook that releases from an aperture carried by the valve member when the backwater flow rises to the first water level, the valve member may operate as a normally closed valve after the backwater flow has receded from the valve body, the valve member may comprise a sealing face having a convex surface and a concave surface opposite the sealing face, the concave surface defining the basin, and the sealing surface engaging the inlet when the valve member is in the closed position, latching the valve in an open position may comprise removing the valve member from the hollow valve body, connecting the releasable latch, and inserting the valve member into the open position in the hollow valve body, the step of latching the valve member may comprise loading a spring member of the releasable latch, the method may further comprise the step of sensing when the releasable latch has been released, and the step of sensing when the releasable latch has been released comprises sensing the completion of an electrical circuit by the releasable latch.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A backwater valve, generally identified by reference numeral 10, will now be described with reference to FIG. 1 through 13. Backwater valve 10 is intended to be installed as part of a fluid drainage system from a building and is used to block backflow of fluid through back into the building, such as in the event of a flood, which may cause water in a sewer system to flow back into the building.

Figure 1:
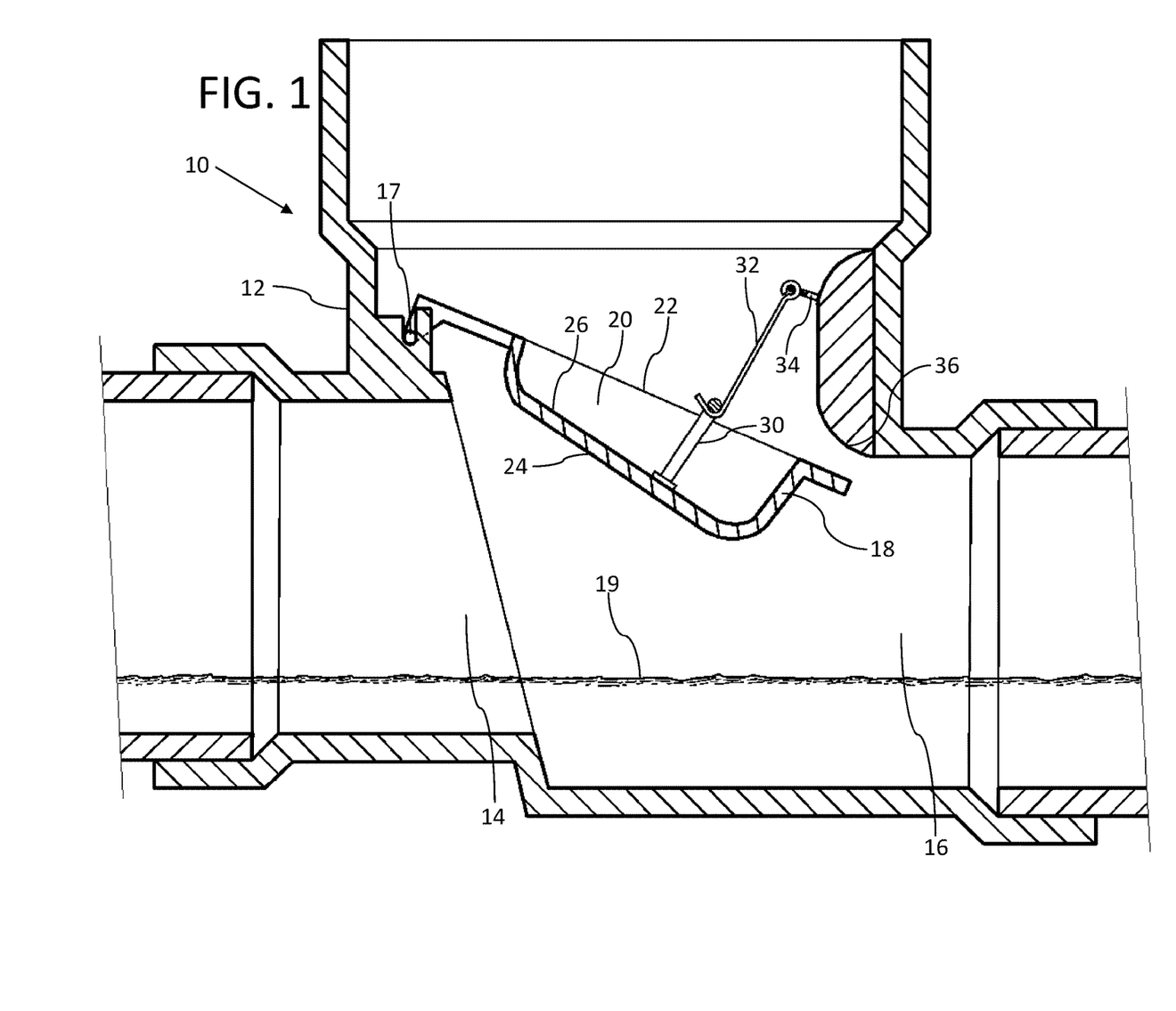
FIG. 1 is a side view in section of a latching backwater valve latched in the open position.

Referring to FIG. 1, backwater valve 10 has a hollow valve body 12 with an inlet 14 and an outlet 16. A valve member 18 is pivotally connected to hollow valve body 12. Valve member 18 has a pivot axis 17 above inlet 14. Valve member 18 is held in an open position by a releasable latch that is designed to release valve member 18 when a certain water level is reached, and allow valve member 18 to move to the closed position. One example of a releasable latch is sown in FIG. 1, made up of an aperture 30 carried by valve member 18, and a hook 32 pivotally attached to hollow valve body 10 by an anchor 34. It will be understood that other designs for a releasable latch that releasably connects valve member 18 and valve body 12 may be used, some of which are discussed below.

Figure 2:
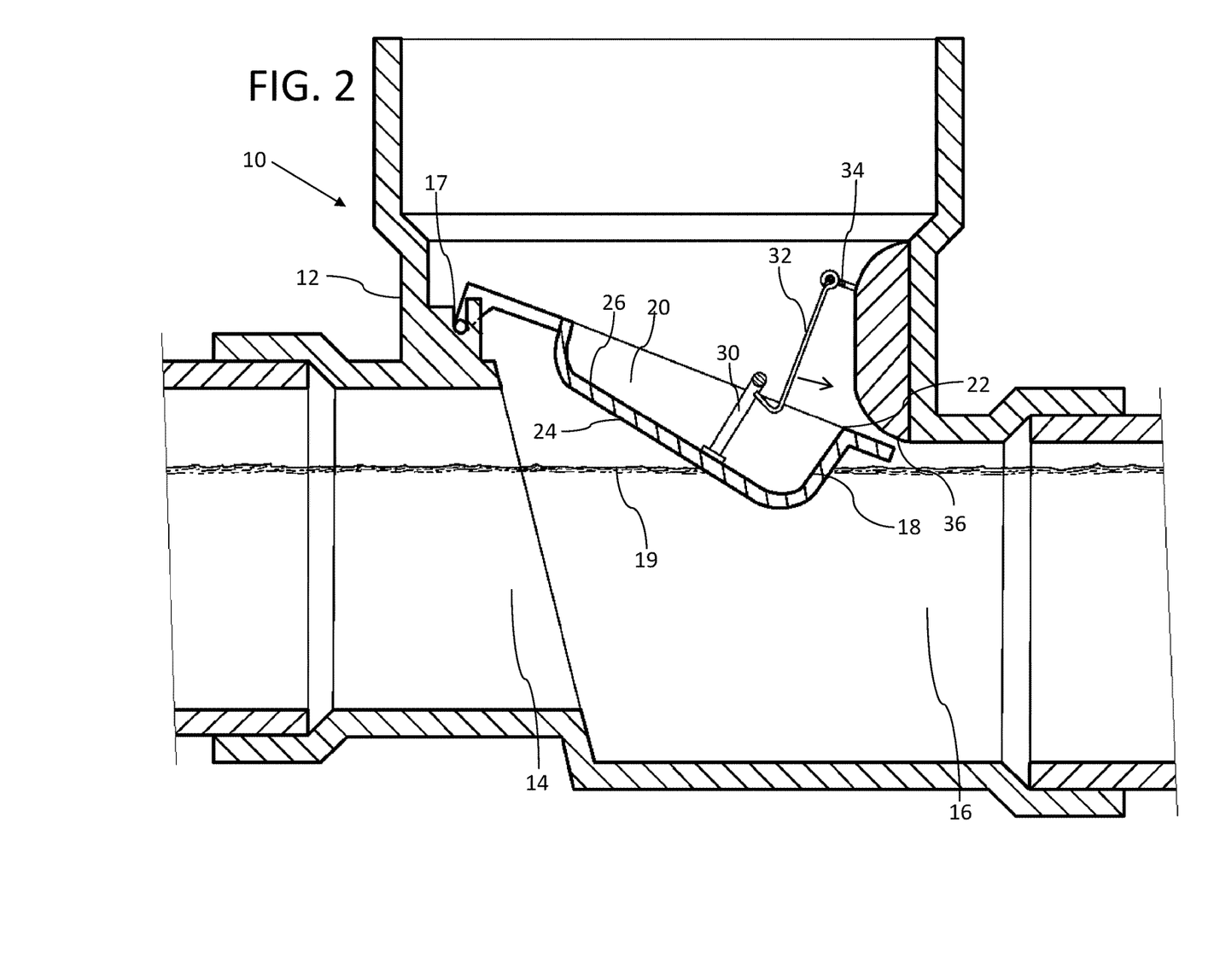
FIG. 2 is a side view in section of a latching backwater valve in the release position.

Under normal operating conditions, valve member 18 is suspended from hook 32, such that valve member 18 is retained in the open position above inlet 14 against the force of gravity. Hook 32 is in turn held in position based on the weight of valve member 18. As depicted in FIG. 2, when valve member 18 is pivoted or lifted to a release position in response to rising backwater flow 19, hook 32 is released from aperture 30, which frees valve member 18 to pivot from the release position toward the closed position shown in FIG. 4.

Referring to FIG. 2, valve member 18 has a basin 20 that is normally air-filled, or empty of liquid, and is shaped such that it allows valve member 18 to be displaced upward in response to a rising fluid level, such as backflow. However, the weight of valve member 18 is greater than the fluid that is expected to be encountered in backwater valve 12, either because of the specific gravity of the material used to form valve member 18 or because valve member 18 carries an additional weight, such that it will sink when valve member 18 submerged in water such that basin 20 is not filled with air.

In the depicted example, valve member 18 has a convex sealing face 24 and a concave basin surface 26 opposite convex sealing face 24. As water rises, the convex sealing face 24 is lifted with the water level due to the buoyancy resulting from air in concave basin surface 26 until valve member 18 encounters a stop member 36, which prevents further movement of valve member 18 if the water level continues to rise. Stop member 36 will be positioned to allow latch stop movement Valve member 18 has a basin opening 22 located at the lower end of valve member 18 (or the remote end relative to pivot point 17) that allows fluid to overflow into basin 20 when the water level rises relative to valve member 18. Basin opening 22 allows water to overflow into basin 20 when the fluid level reaches a certain height and fill with water. In this manner, valve member 18 is displaced upward when filled with air and descends when filled with water to allow valve member 18 to close. As shown, basin opening 22 is merely a point of concave basin surface that is maintained at a lower position relative to the rest of valve member 18. Other designs may also be possible, such as a port or flow channel formed in valve member 18 that allows for a similar result to be achieved. However, the depicted design is beneficial in that it is relatively simple to manufacture, while permitting valve member 18 to float and then fill with water when a certain level is reached to descend through the water. Basin surface 26 and basin opening 22 are also preferably configured such that when valve member 18 is in the closed position and the fluid recedes out of the hollow valve body, fluid will completely drain from basin 20. As valve member 18 will be in the "normally closed" configuration once the latch has been released and the backwater has receded, it is beneficial to ensure that valve member 18 does not continue to carry water so that it will to be responsive to the flow of water from inlet 14. In addition, removing water from basin 20 is also a required step to reset valve member 18, whether valve member 18 is reset in situ, or is reset by removing and replacing valve member 18.

Figure 3:
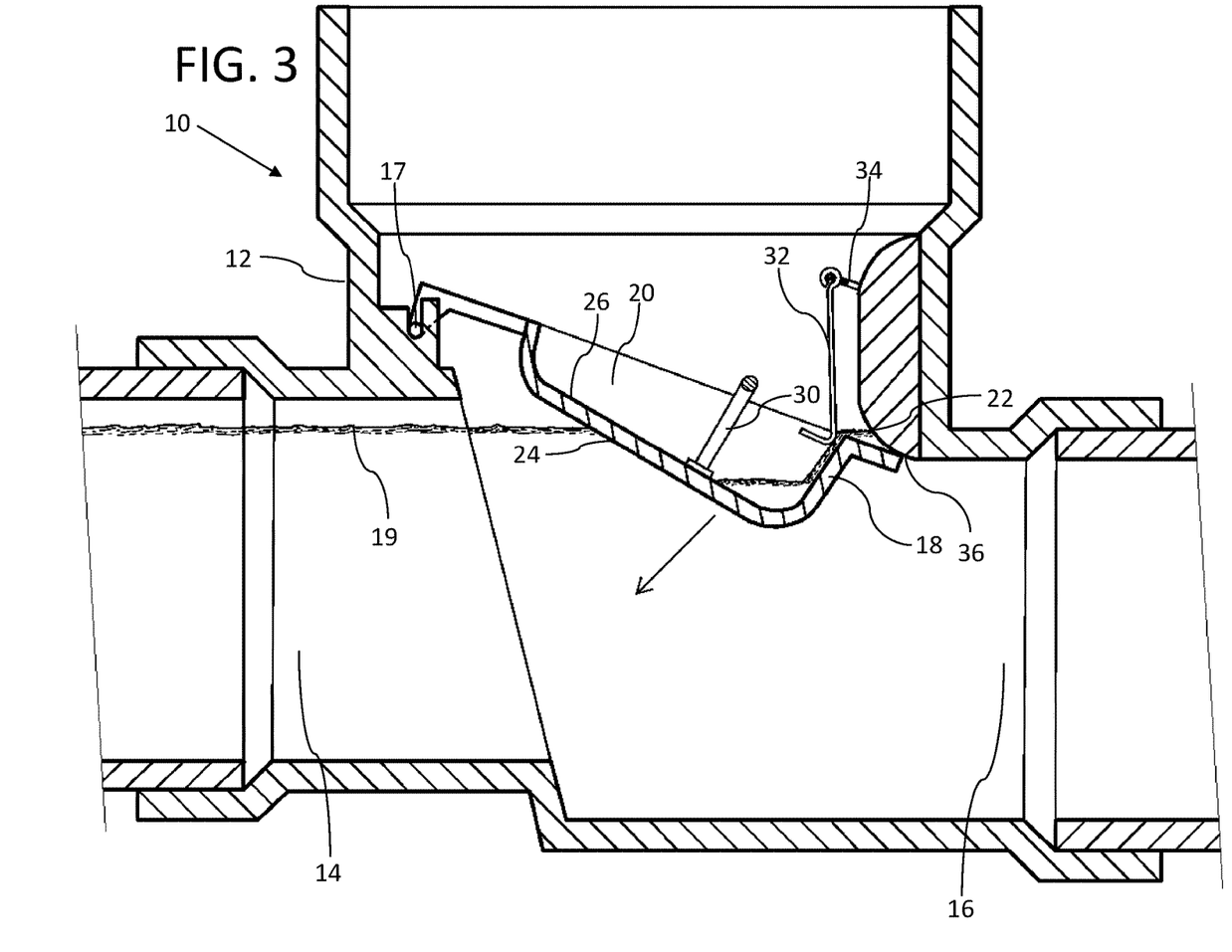
FIG. 3 is a side view in section of a latching backwater valve being flooded.
Figure 4:
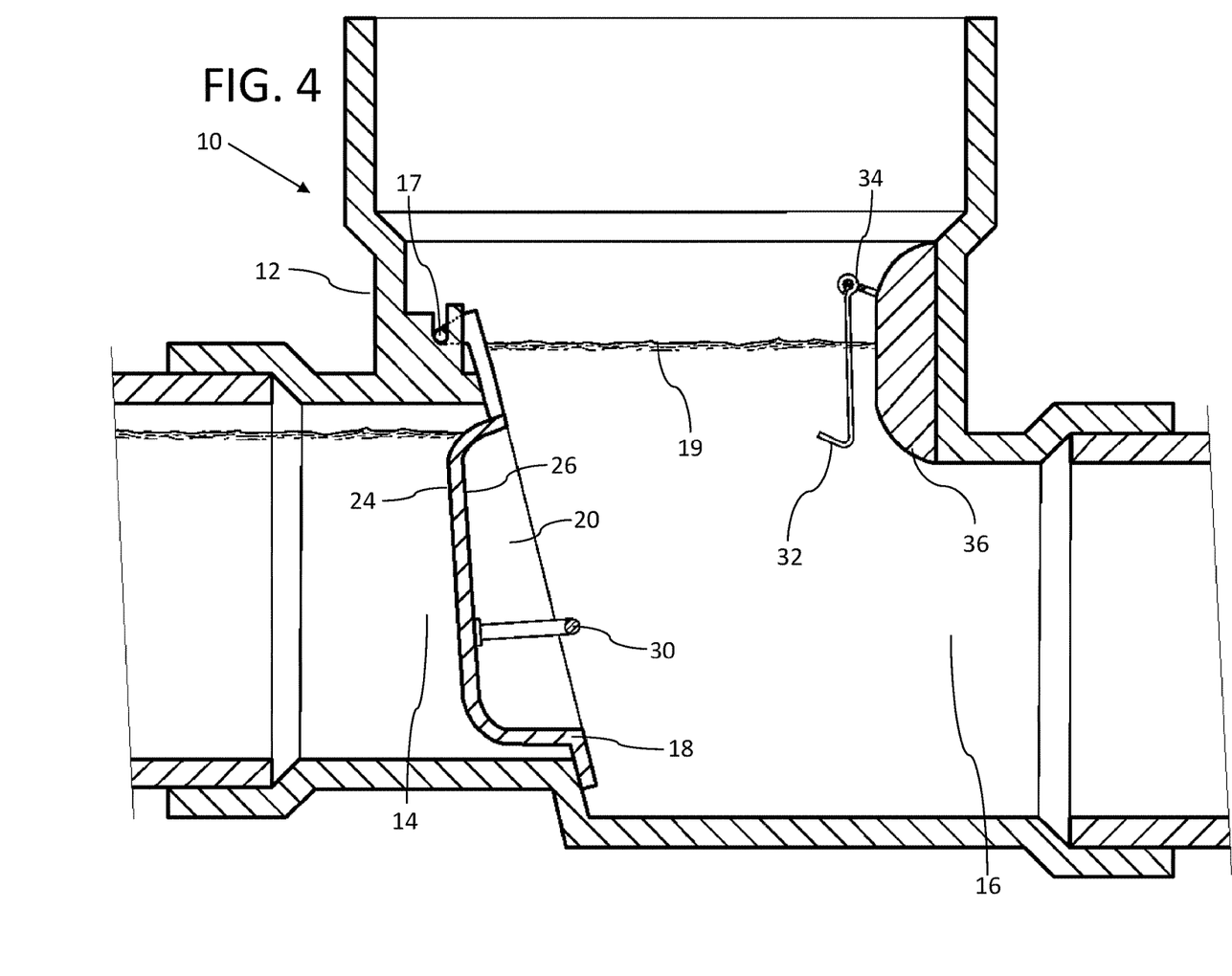
FIG. 4 is a side view in section of a latching backwater valve in the closed position.
Figure 6:
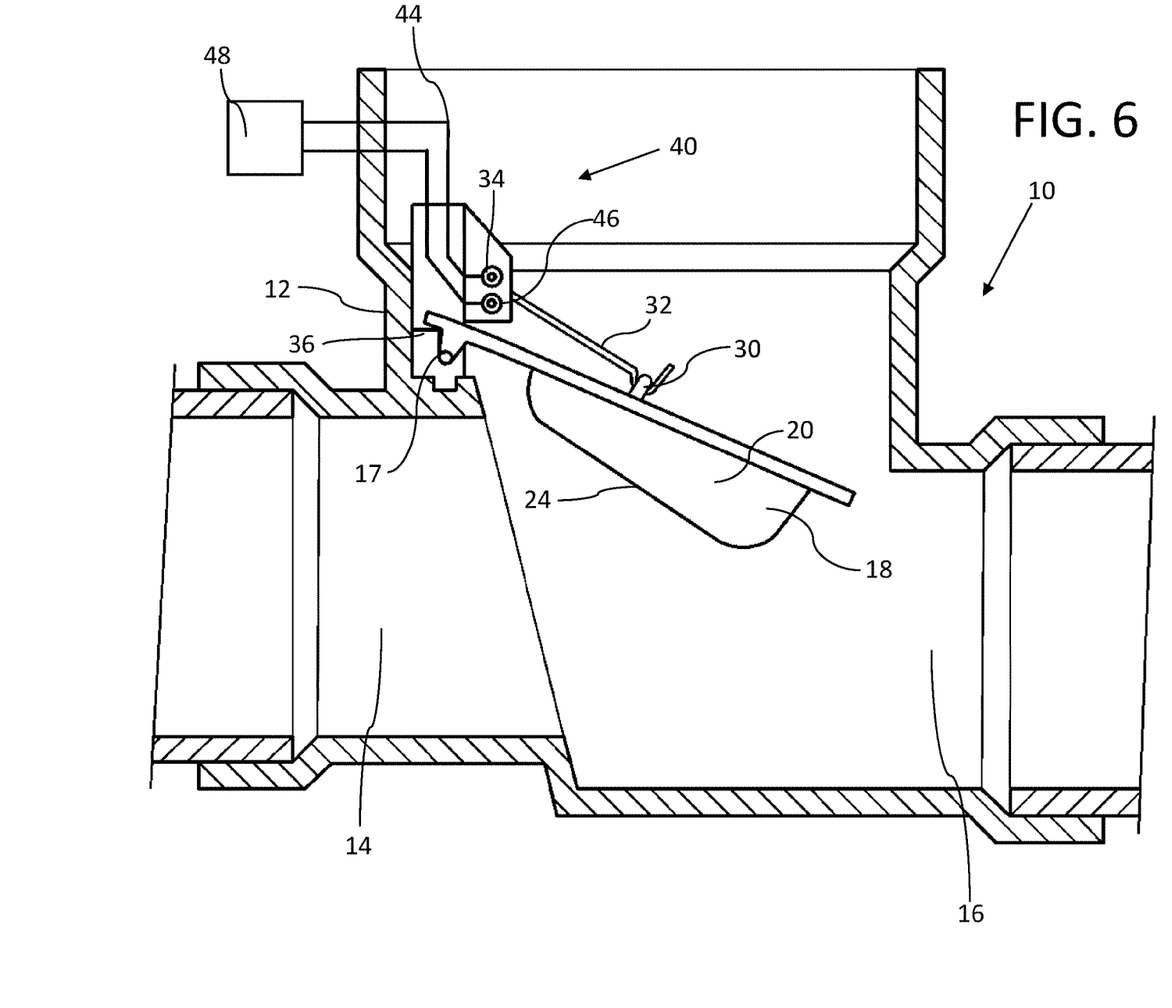
FIG. 6 is a side view in section of an alternative embodiment of a latching backwater valve in the open position.
Figures 8, 9:
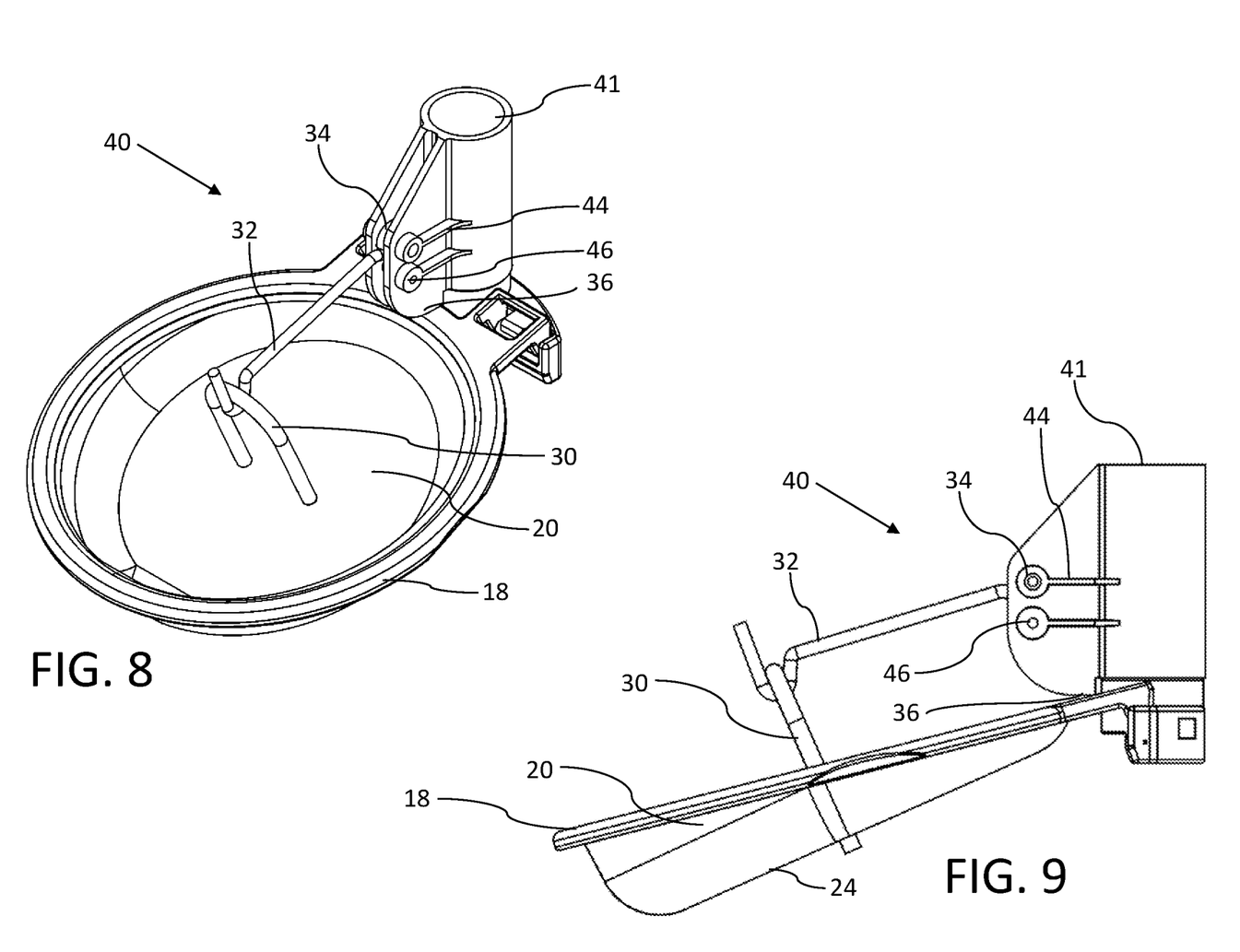
FIG. 8 is perspective view of a latched valve cartridge of a latching backwater valve.
FIG. 9 is a side view of a latched valve cartridge of a latching backwater valve.

As noted above, there is a rotational stop 36 located in the path of travel of valve member 18 that prevents further movement of valve member 18, which defines the fill position of valve member 18. As depicted, rotational stop 36 is a shoulder provided on an inner surface of hollow valve body 12 that comes into contact with valve member 18 as it rotates upward about pivot point 17. It will be understood that other structures may be used as a rotational stop to limits upward pivotal movement of valve member 18, and that it may be provided in different locations. In one example, there may be a linkage may be provided that is connected between valve member 18 and the bottom or sides of hollow valve body 12 to limit upward movement. In another example, as shown in FIG. 6, rotational stop 36 may be provided above inlet 14, where rotational stop 36 is adjacent to pivot 36 of valve member 18. Another example of a rotational stop 36 adjacent to pivot 36 is shown in FIG. 8, where stop 36 engages the top surface of valve member 18. In each example, as valve member 18 rises, it engages rotational stop 36, which inhibits further pivotal movement past the designated position. This designated position may be referred to as the fill position, and as the level of backwater flow 19 rises, basin opening 22 allows basin 20 to fill with water, as shown in FIG. 3. Referring to FIG. 4, once basin 20 is filled with water and latch 32 is released, valve member 18 is permitted to sink and move to the closed position in which sealing face 24 directly engages inlet 14 to prevent further backwater flow 19 from flowing through inlet 14, as shown in FIG. 4.

Referring to FIG. 2, hook 32 detaches from aperture 30 when valve member 18 is in the release position, and basin 20 fills with backwater when valve member 18 is in the fill position as shown in FIG. 3. As depicted, the fill position is higher than the release position to ensure that hook 32 releases prior to basin 20 filling with water. It will be understood that the relative positions where the release and fill events occur may vary and may even occur at the same location in some designs. Depending on the design of the latch, which may be a more complex structure, the release may begin to occur at the release position, and may be completed as valve member 18 begins to fall, such as if a j-channel and pin follower is used as the releasable. In some cases, valve member 18 may be designed with a basin opening that is opened by the release of the latch, such that basin 20 is only exposed to backwater flow 19 after the latch has released.

Figure 5:
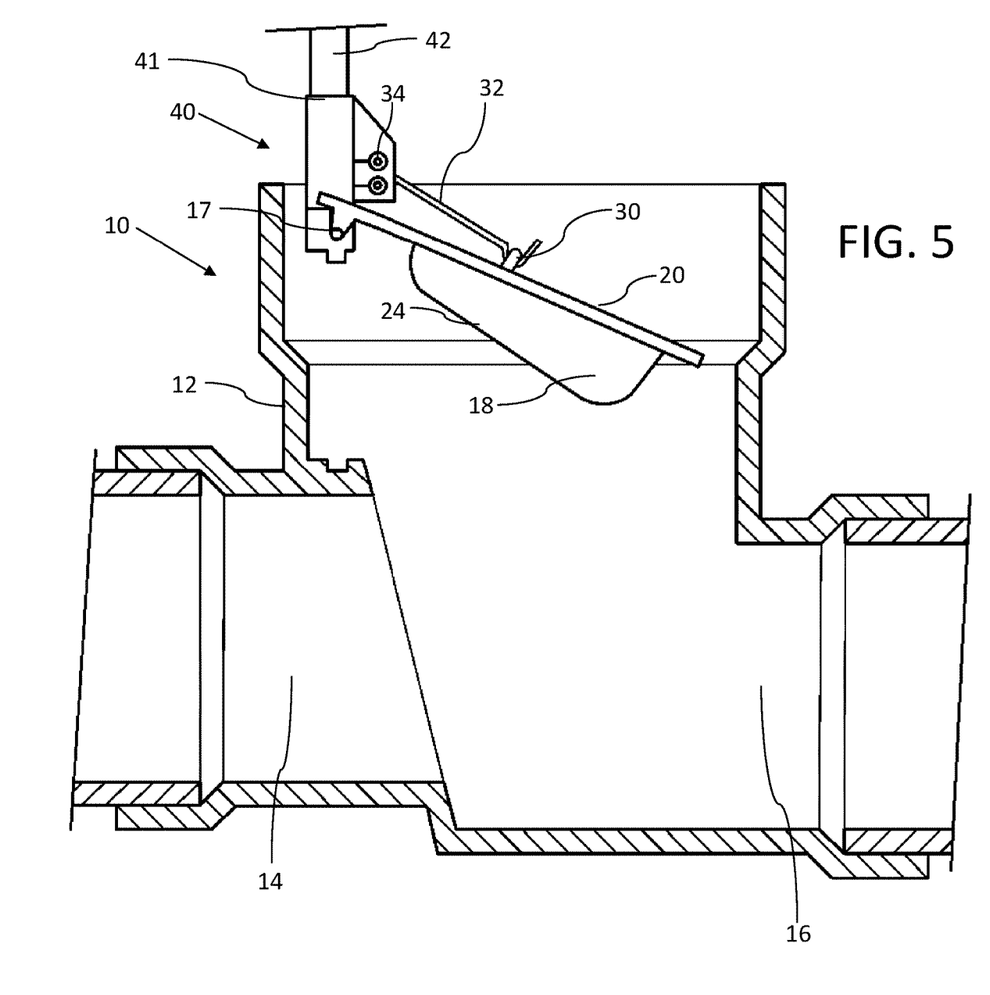
FIG. 5 is a side view in section of a valve cartridge of a latching backwater valve being inserted into a hollow valve body.

Referring to FIG. 5 through FIG. 11, an alternative embodiment of backwater valve 10 is shown with a different style of latch. As depicted in FIG. 5, valve member 18 may be part of a valve cartridge 40 that may be selectively inserted and removed from hollow valve body 12. This design may be used to facilitate servicing backwater valve 10, installation or retrofitting of an existing backwater valve 10, or resetting valve member 18 after a backwater event. Valve cartridge 40 may be design carry anchor 34 and hook 32 as depicted. Once valve member 18 is released, it may be reset by removing cartridge 40 from hollow valve body 12 so that valve member 18 can be manually re-latched and then re-inserted into hollow valve body 12, or remotely by reaching in to engage valve member 18 using a tool. As shown, cartridge 40 includes an extension rod 42 that removably engages a socket 41 that allows for the manipulation of cartridge 40, such as for installation or removal. As shown, rotational top 36 is also carried by cartridge 40, although other designs may also be possible.

Figure 7:
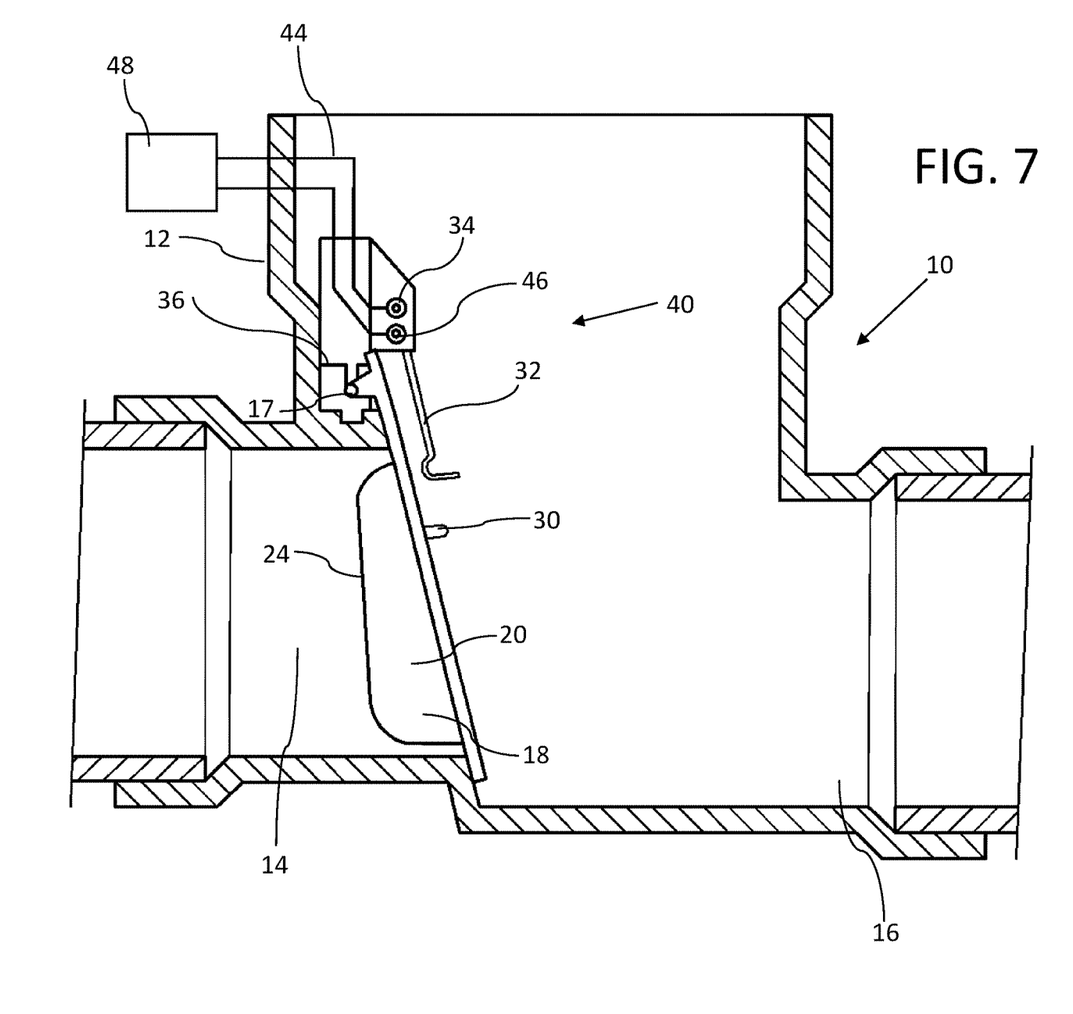
FIG. 7 is a side view in section of an alternative embodiment of a latching backwater valve in the closed position.
Figure 10:
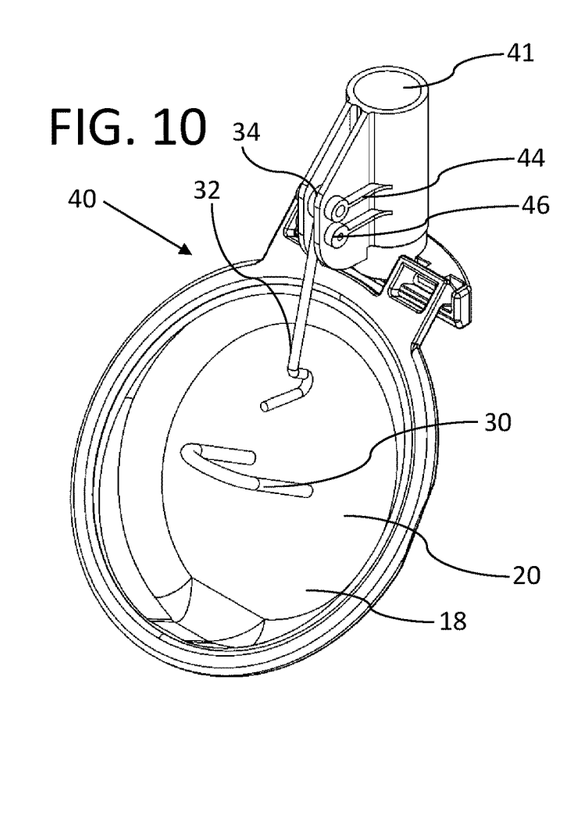
FIG. 10 is a perspective view of a released valve cartridge of a latching backwater valve.
Figure 11:
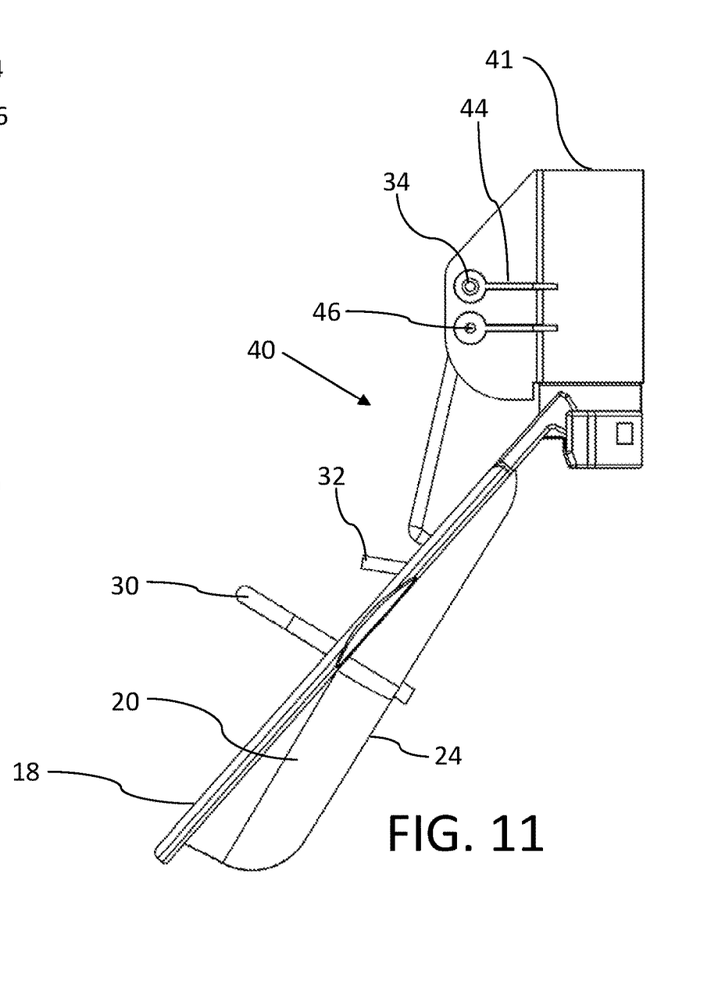
FIG. 11 is a side view of a released valve cartridge of a latching backwater valve.

Referring to FIGS. 6 and 7, backwater valve 10 may have an electrical circuit 44 connected to a sensor 48 that senses when the releasable latch has released valve member 18 to notify a user that the backwater valve has closed, typically because of a backwater event. In one example, releasable latch 32 may be part of electrical circuit 44, such that when valve member 18 is latched the circuit is disconnected, as shown in FIG. 6, FIG. 8 and FIG. 9, and when valve member 18 is released, hook 32, which may be made of conducting material, falls to make contact with an electrical contact 46, thus completing electrical circuit 44 and being sensed by sensor 48, or triggering an alarm, as shown in FIG. 7, FIG. 10 and FIG. 11. Other configurations of electrical circuit 44 may be possible, such as a circuit that is complete when valve member 18 is latched and disconnects the complete circuit when valve member 18 is released. Circuit 44 may be part of a sensor package that triggers and audible alarm, a visual alarm, or the transmission of an electronic signal to a remote device, such as to a smart phone or computer network, to notify users of the status of backwater valve 10.

Figure 12:
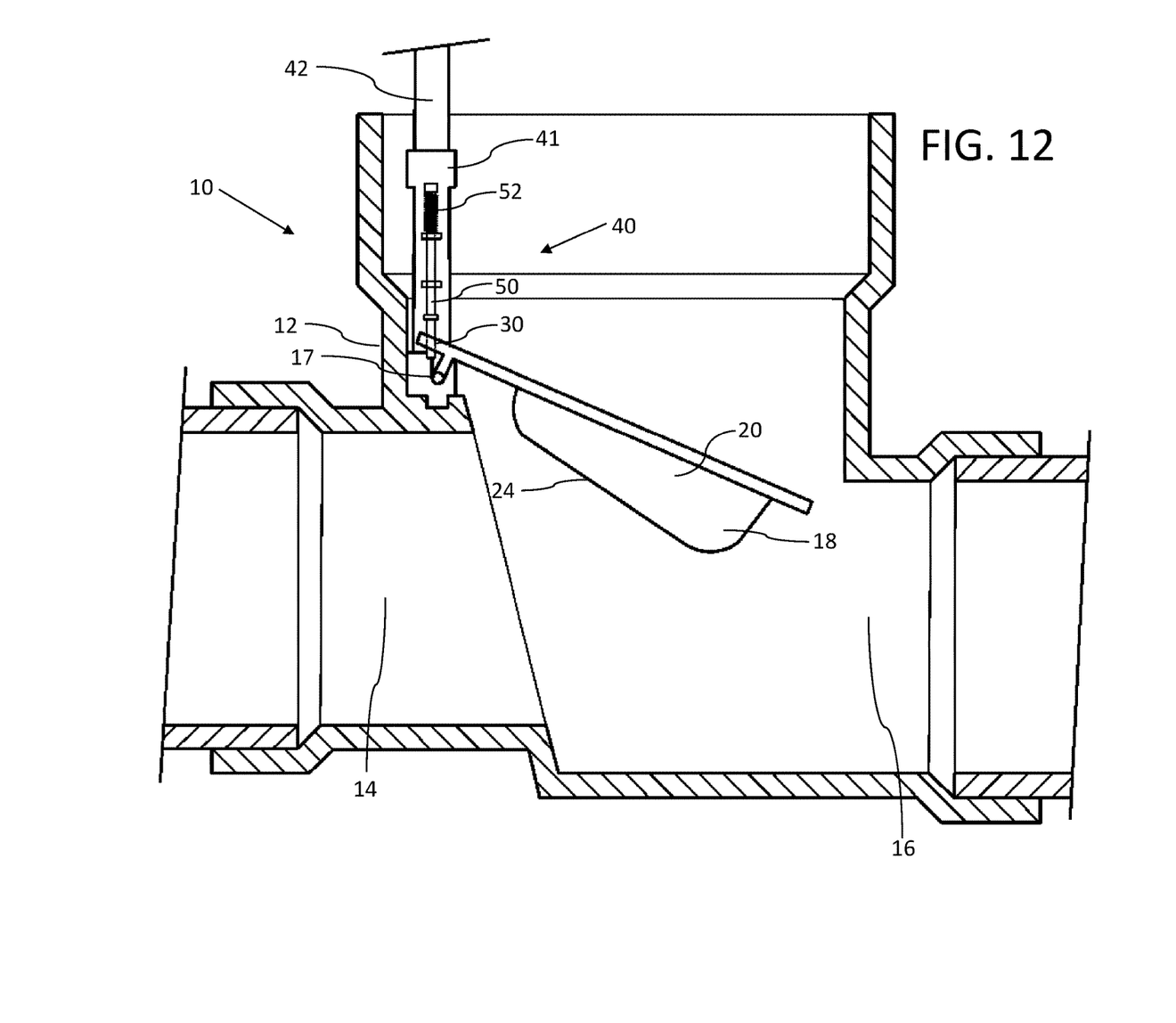
FIG. 12 is a side view in section of a spring-loaded latching backwater valve in the open position.
Figure 13:
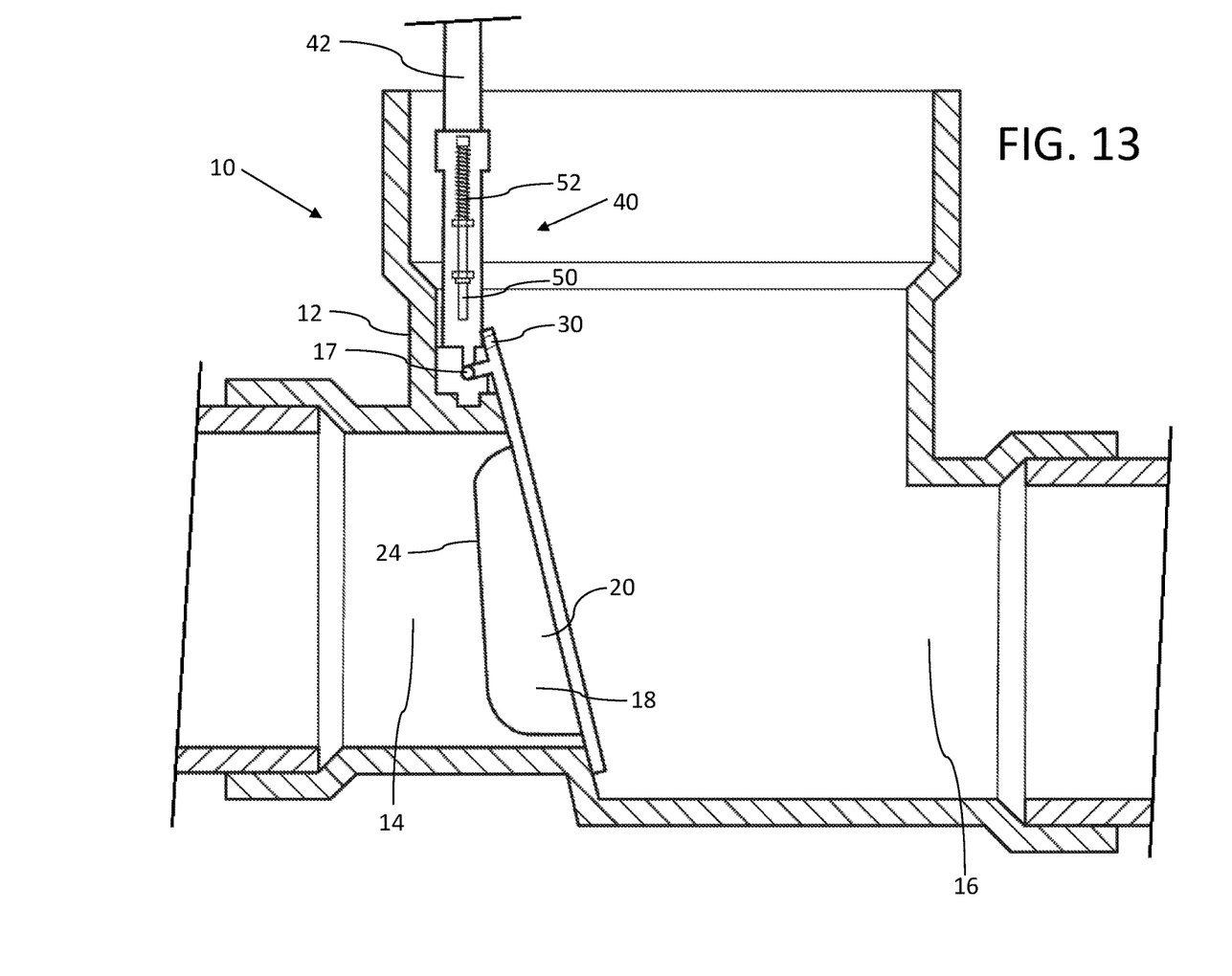
FIG. 13 is a side view in section of a spring-loaded latching backwater valve in the closed position.

Referring now to FIGS. 12 and 13, an example of a spring loaded latch is shown, where the latch retracts under spring force when valve member 18 pivots to the release position. In the depicted example, the releasable latch is a post 50 or other elongate object that is biased away from valve member 18 by a spring 52. In the latched position, post 50 extends through an aperture 30 in valve member 18. In this position, post is secured within aperture 30 by friction due to the weight of valve member 18. This also holds valve member 18 in the latched position. Post 50 may be held in engagement with aperture 30 via friction as shown, which may be increased by a textured profile, or may be provided with a catch-style profile, such as a support shoulder carried by post 50 that is engaged by vale member 18. When valve member 18 pivots to the release position, aperture 30 is disengaged from post 50, which is then allowed to retract from aperture 30 due to the force of spring 52. Once retracted, valve member 18 is free to pivot to the closed position as shown in FIG. 14, once basin 20 is filled with water. It will be understood that other configurations of a spring-loaded latch may be possible, such a spring 52 that is configured to retract a hook 32 or other latches known in the art.

A method of preventing a backflow of water using backwater valve 10 described above will now be described with reference to FIG. 1 to FIG. 4. While backwater valve 10 is commonly used to prevent a backflow of sewage into a residential home, it will be understood that backwater valve 10 may be installed in other situations to address similar problems.

Backwater valve 10 is installed in the path of a potential backflow of water, with inlet 14 and outlet 16 being connected to the path. Valve member 18 is held in the open position by hook 32 and aperture 20 of the releasable latch and water is allowed to flow through hollow valve body 12, as shown in FIG. 1. Upon occurrence of a backwater flow 19 rising to a level at which backwater flow 19 engages convex sealing face 24 of valve member 18, valve member 18 is permitted to float upon backwater flow 19 and pivot away from the open position. As backwater flow 19 raises further valve member 18 pivots to a release position where the releasable latch disconnects and releases valve member 18. As depicted in FIG. 2, releasable latch disconnects by hook 32 falling away from aperture 30, however it will be understood that other methods of disconnecting valve member 18 known in the art may be used. After valve member 18 has been released and backwater flow 19 continues to rise, valve member 18 will float to a fill position at which backwater flow 19 is permitted to flood basin 20 through basin opening 22, as shown in FIG. 2, resulting in valve member 18 losing its buoyancy. Valve member 18 may engage a rotational stop 36 at the fill position inhibiting further rotational movement of valve member 18 and allowing backwater flow 19 to rise higher that basin opening 22. After water has flooded basin 20, valve member 18 sinks and pivots to the closed position shown in FIG. 3. In the closed position, valve member 18 directly engages and covers inlet 14, preventing backwater flow 19 from flowing through inlet 14.

As depicted, valve member 18 has convex sealing surface 24 that seals against inlet 14, however it will be understood that valve member 18 may have any shape that prevents backwater flow 19 from flowing through inlet 14.

Once in the closed position, valve member 18 may operate as a normally closed valve after the backwater flow has receded from the valve body until valve member 18 is reset to the normally open position.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A backwater valve, comprising:
   a hollow valve body having an inlet and an outlet;
   a valve member pivotally movable about a pivot axis disposed above the inlet, the valve member being movable between a closed position in which the valve member directly engages and covers the inlet to prevent fluid flow through the inlet and an open position in which the valve member is away from the inlet;
   wherein:
   the valve member has a specific gravity that is greater than water;

the valve member comprises a basin that causes the valve member to be buoyant in water when the valve member is in the open position and the basin is filled with air, the basin comprising a fill opening;

a releasable latch that retains the valve member in the open position, the releasable latch releasing the valve member when the valve member pivots to a release position above the open position to permit pivotal movement of the valve member toward the closed position; and a rotational stop that engages the valve member at a fill position to permit a sufficiently high water level to flow into the basin through the fill opening, the fill position being at or above the release position.

2. The backwater valve of claim 1, wherein the releasable latch comprises a hook that is adapted to be released from an aperture carried by the valve member when the valve member pivots to the release position.

3. The backwater valve of claim 1, wherein the valve member operates as a normally closed valve after the high water level has receded from the hollow valve body.

4. The backwater valve of claim 1, wherein the valve member comprises a sealing face having a convex surface, and a concave surface that defines the basin opposite the sealing face, wherein the sealing surface is adapted to engage the inlet when the valve member is in the closed position.

5. The backwater valve of claim 1, wherein the releasable latch is a spring-loaded, the releasable latch retracting and releasing the valve member when the valve member pivots to the release position.

6. The backwater valve of claim 1, wherein the valve member comprises a removable valve cartridge.

7. The backwater valve of claim 6, further comprising an extension rod that releasably engages the removable valve cartridge to remove the valve cartridge from the hollow valve body.

8. The backwater valve of claim 1, further comprising an electrical circuit connected to a sensor that senses when the releasable latch has released the valve member based on a state of the electrical circuit.

9. The backwater valve of claim 8, wherein the releasable latch changes the electrical circuit from an open state to a closed state upon releasing the valve member.

10. The backwater valve of claim 1, wherein the rotational stop is located above and adjacent to the inlet.

11. A method of preventing backwater flow comprising the steps of:

installing a backwater valve in a path of the backwater flow, the backwater valve comprising:

a hollow valve body having an inlet and an outlet; and a valve member pivotally movable about a pivot axis disposed above the inlet; wherein:

the valve member has a specific gravity that is greater than water; and the valve member comprises a basin, the top of the basin comprising an opening;

using a releasable latch, latching the valve member in an open position in which the valve is away from the inlet;

upon a backwater flow rising to a first water level within the hollow valve body, permitting the valve member to float upon the backwater flow and pivot from the open position to a release position;

releasing the releasable latch when the valve member reaches the release position; and after the releasable latch is released, permitting water to flood the basin through the opening of the basin such that the valve member sinks and pivots to a closed position in which the valve member directly engages and covers the inlet to prevent the backwater flow from flowing through the inlet.

12. The method of claim 11, wherein water floods the basin upon the backwater flow rising to a second water level beyond the first water level.

13. The method of claim 12, wherein the valve engages a rotational stop when the backwater flow is at or below the second water level.

14. The method of claim 11, wherein the releasable latch comprises a hook that releases from an aperture carried by the valve member when the backwater flow rises to the first water level.

15. The method of claim 11, wherein the valve member operates as a normally closed valve after the backwater flow has receded from the hollow valve body.

16. The method of claim 11, wherein the valve member comprises a sealing face having a convex surface and a concave surface opposite the sealing face, the concave surface defining the basin, and the sealing surface engaging the inlet when the valve member is in the closed position.

17. The method of claim 11, wherein latching the valve in an open position comprises removing the valve member from the hollow valve body, connecting the releasable latch, and inserting the valve member into the open position in the hollow valve body.

18. The method of claim 11, wherein the step of latching the valve member comprises loading a spring member of the releasable latch.

19. The method of claim 11, further comprising the step of sensing when the releasable latch has been released.

20. The method of claim 19, wherein the releasable latch completes an electrical circuit that is connected to a sensor when the releasable latch is released.

* * * * *